United States Patent [19]
Kim et al.

[11] Patent Number: 5,825,569
[45] Date of Patent: Oct. 20, 1998

[54] CONSTANT-DENSITY MAGNETIC DISC APPARATUS AND MAGNETIC DISC USED THEREFOR

[75] Inventors: Jin-Seok Kim; Jae-Deog Joo, both of Incheon, Rep. of Korea

[73] Assignee: SamSung Electronics Co., Ltd., Kyungki-do, Rep. of Korea

[21] Appl. No.: 597,312

[22] Filed: Feb. 6, 1996

[30] Foreign Application Priority Data

Feb. 8, 1995 [KR] Rep. of Korea ............... 2270/1995

[51] Int. Cl.$^6$ .................................................. G11B 20/12
[52] U.S. Cl. ............................................. 360/51; 360/48
[58] Field of Search ............................ 360/48, 49, 51, 360/77.08

[56] References Cited

U.S. PATENT DOCUMENTS

| | | |
|---|---|---|
| 4,682,253 | 7/1987 | Leslie . |
| 4,811,135 | 3/1989 | Janz . |
| 4,823,212 | 4/1989 | Knowles et al. . |
| 4,956,727 | 9/1990 | Bezinque et al. ............ 360/49 |
| 4,977,472 | 12/1990 | Volz et al. . |
| 5,121,280 | 6/1992 | King . |
| 5,257,149 | 10/1993 | Meyer ............................ 360/78.14 |
| 5,278,703 | 1/1994 | Rub et al. ........................... 360/51 |
| 5,327,302 | 7/1994 | Khoury et al. .................. 360/51 X |
| 5,345,342 | 9/1994 | Abbott et al. ........................ 360/48 |
| 5,544,135 | 8/1996 | Akin, Jr. et al. .............. 360/77.08 X |
| 5,587,850 | 12/1996 | Ton-that ......................... 360/77.08 |
| 5,631,783 | 5/1997 | Park ..................................... 360/51 |

Primary Examiner—Aristotelis M. Psitos
Assistant Examiner—K. Wong
Attorney, Agent, or Firm—Robert E. Bushnell, Esq.

[57] ABSTRACT

A magnetic disc used in a constant-density magnetic disc driving apparatus includes a wedge identification field following a servo information area that contains a wedge identification for identifying a plurality of data sectors located within a corresponding data information area. A pseudo identification field positioned at a first portion of each data sector represents a time interval required to generate from the wedge identification a pseudo identification that identifies a corresponding one of the data sectors and transfer the pseudo identification to a controller of the magnetic disc driving apparatus. The pseudo identification field includes a data preamble for providing data synchronization for the corresponding data sector. A data field is positioned behind the pseudo identification field, and the data field and pseudo identification field make up a single data sector. Data that is identified by the pseudo identification and synchronized by the data preamble is written in the data field.

13 Claims, 5 Drawing Sheets

CONSTANT-DENSITY MAGNETIC DISC APPARATUS AND MAGNETIC DISC USED THEREFOR

CROSS-REFERENCE TO RELATED APPLICATIONS

This application makes reference to, incorporates the same herein, and claims all benefits accruing under 35 U.S.C. §119 from an application for Constant—Density Magnetic Disc Apparatus And Magnetic Disc Used Therefor earlier filed in the Korean Industrial Property Office on 8 Feb. 1995 and there assigned Serial No. 2270/1995.

BACKGROUND OF THE INVENTION

The present invention relates to a magnetic disc apparatus employing constant-density when accessing data on a magnetic disc surface and the magnetic disc used therefor.

A "constant-density" or "zone-bit" type of recording method has been proposed in order to enhance the storage capacity of the magnetic disc.

The information recording area of a magnetic disc surface is split into a plurality of zones, and information is recorded so that the density of data recorded in each of the divided zones is substantially constant. Within the respectively divided track zones, the number of data sectors varies. That is, tracks in the outer zones have more data sectors than those in the inner zones. The data sector represents a unit area in which a magnetic disc driver accesses data on the magnetic disc surface. Furthermore, the data sector has a uniform size (e.g., 512 bytes) irrespective of its position on the magnetic disc surface. When an embedded servo sector is employed in a servo method, one data sector can be divided into two segments depending on each zone on the magnetic disc. Use of the embedded servo sector is one way to provide location information of the head to the magnetic disc driver. With the embedded servo sector, each track is divided into a servo information area and a data information area, and these areas are alternately arranged in the circumferential direction of the disc. The servo information area in which the embedded servo information is recorded provides the servo sector, and the data information area in which actual data is recorded provides the data sector.

As mentioned above, constant-density recording enables all of the tracks to have substantially the same information density, so that a greater amount of data can be recorded on each track of the magnetic disc surface. Therefore, constant-density recording is widely used in magnetic disc apparatuses.

With the constant-density type of recording, when data information is recorded on a track provided in a zone having more than two complete data sectors between the servo sectors, after data is recorded in a preceding data sector, the ID of a following data sector is read. Therefore, when changing from a write state to a read state, switching noise, often referred to as Barkhausen noise, popcorn noise or wiggle noise, may occur due to variations in the excitation current applied to the magnetic head. Generally, the switching noise is generated because the magnetic disc driver shares one head during read and write operations, and this often causes malfunctions with the magnetic disc driver.

In order to prevent such malfunctions, a minimum timing margin is necessary to stabilize the head when the write state changes to the read state. The timing margin is an absolute time value regardless of the data transfer rate. Thus, the magnetic disc apparatus is designed to have a timing margin corresponding to a write/read transition time between a data field and an ID (i.e., identification) field. Such a timing margin can be provided by designing a data postamble of the data field and an ID preamble of the ID field to last longer than the write-read transition time.

In this case, however, there occurs a problem of reducing the total capacity of the magnetic disc by the timing margin. The amount of capacity reduction is even greater when the magnetic disc surface accommodates higher recording densities and data transfer rates, since the amount of data per unit time to access increases in accordance with the increase in recording density and data transfer rate, while the required timing margin always remains constant.

In order to solve such a problem, a technique using a Wedge ID (hereinafter referred to as a "WID") which contains the ID of all data sectors located in one data information area (instead of recording respective IDs of the data sectors located in the data information area on the magnetic disc), and a Pseudo ID (hereinafter referred to as a "PID") generated from the WID has been disclosed in U.S. patent application Ser. No. 5,631,783, issued 20 May 1997 to Park and assigned to the assignee of the present invention. While this type of format is clearly beneficial in its own right, we have observed that the storage capacity of a magnetic disc can be increased even further.

SUMMARY OF THE INVENTION

It is therefore an object of the present invention to provide an improved magnetic disc.

It is another object to provide a magnetic disc apparatus capable of increasing data storage capacity on a magnetic disc by effectively using a PID field on the magnetic disc.

It is still another object to provide a magnetic disc apparatus capable of using a PID field on a magnetic disc to provide data synchronization.

To achieve these and other objects, the present invention provides a magnetic disc used in a high-density magnetic disc driving apparatus. The magnetic disc includes a wedge identification field following a servo information area that contains a wedge identification for identifying a plurality of data sectors located within a corresponding data information area. A pseudo identification field positioned at a first portion of each data sector represents a time interval required to generate from the wedge identification a pseudo identification that identifies a corresponding one of the data sectors and transfer the pseudo identification to a controller of the magnetic disc driving apparatus. The pseudo identification field includes a data preamble for providing data synchronization for the corresponding data sector. A data field is positioned behind the pseudo identification field, and the data field and pseudo identification field make up a single data sector. Data that is identified by the pseudo identification and synchronized by the data preamble is written in the data field.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENT

Figures 1, 2:
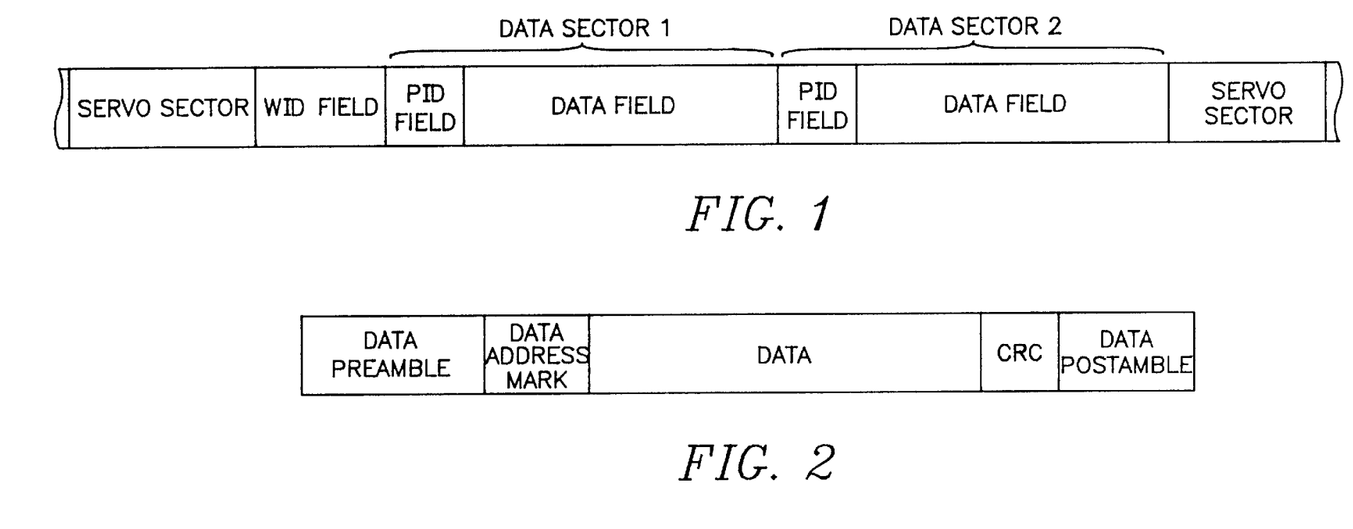
FIG. 1 shows a data format on a magnetic disc to which the present invention is applied.
FIG. 2 shows a detailed format of the data field in FIG. 1.

Turning now to the drawings and referring to FIG. 1, a data format for the magnetic disc disclosed in U.S. Pat. No. 5,631.783 of Park is shown. In particular, FIG. 1 shows a data format in which two complete data sectors are positioned between consecutive servo sectors in one track of the magnetic disc surface. The data format shown in FIG. 1 is not necessarily shown at an accurate scale. The WID recorded in the WID field following the servo sector contains an identification of all data sectors corresponding to that servo sector, and the PID generated from the WID is for identifying data sectors positioned behind the WID field.

Since after data is written in one data sector, there is no need to read out the ID of the following data sector from the magnetic disc surface, the timing margin according to the write-read transition is unnecessary. This can be achieved by arranging the PID field on the magnetic disc. The PID field represents the interval corresponding to the transfer time of the PID generated from the WID to a disc data controller. Since the PID field is affected only by the data transfer rate, the higher the data transfer rate, the shorter the PID field.

Accordingly, it is possible to increase the storage capacity of the magnetic disc by eliminating the timing margin between the ID and the data needed for a write/read transition. Moreover, the storage capacity of the magnetic disc can be increased even further by increasing the data transfer rate.

In the above-described U.S. Pat. No. 5,631.783 of Park, however, as the interval corresponding to the time required in transferring the PID to the disc data controller cannot be used for storing data, there remains a problem in that the total capacity of the magnetic disc is reduced in proportion to the interval.

Referring to FIG. 2, a detailed format of the undivided data field in FIG. 1 is shown. In FIG. 2, the data field is composed of a data preamble, a data address mark, data, a CRC (Cyclic Redundancy Checking Code) and a data postamble. The data preamble, which is generally comprised of several tens of bytes, is data used for clock synchronization when the magnetic disc driver reads out data. The data address mark indicates the start of the data. The data is digital information physically stored on the magnetic disc. The CRC is an error detection code generated for detecting and correcting data errors. The data postamble provides a gap between the CRC and the area following the CRC.

It has been our observation that if the data preamble is recorded in the PID field, the interval on the magnetic disc corresponding to the data preamble can be used for storing data, and the storage capacity of the magnetic disc is accordingly greater.

In the following description, specific details such as detailed circuit constructions, and the number of bits are set forth to provide a more thorough understanding of the present invention. It will be apparent, however, to those skilled in the art that the present invention may be practiced without these specific details. In other instances, well known features have not been described in detail so as not to obscure the present invention.

Figure 3:
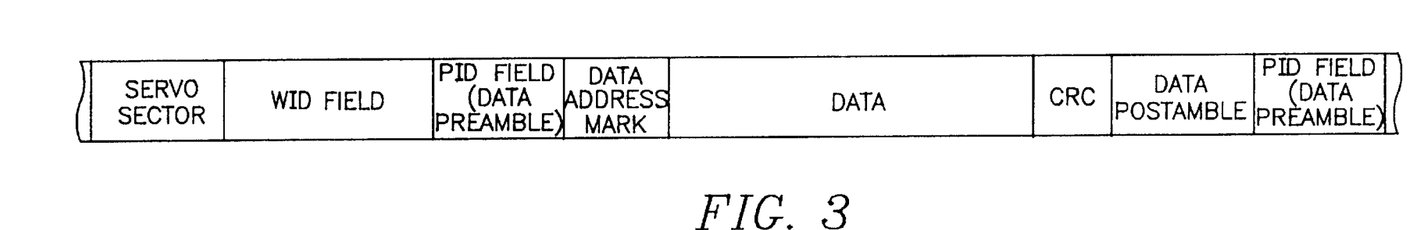
FIG. 3 shows a data format on the magnetic disc according to the present invention.

FIG. 3 shows a data format on a magnetic disc according to the present invention. The scale of the format is not necessarily accurate. In FIG. 2, the data preamble is recorded following the PID field, while in the present invention, the data preamble is recorded within the PID field. That is, the PID field is used as a data preamble interval. Therefore, the interval on the magnetic disc normally occupied by the data preamble can be used for data storage, thereby resulting in increased data storage capacity.

Figure 4:
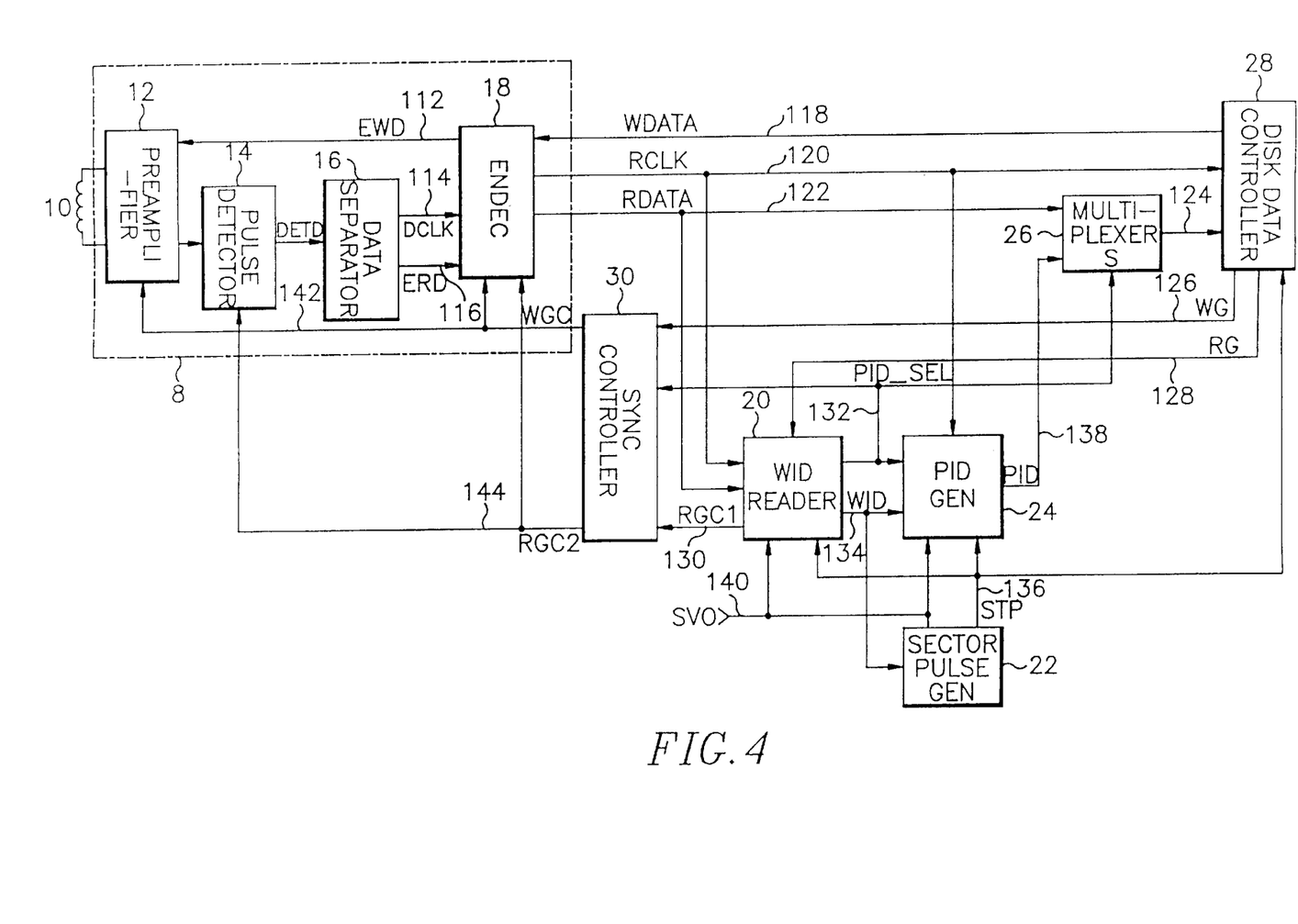
FIG. 4 is a block diagram showing a magnetic disc driver including a sync controller according to the present invention.

FIG. 4 is a block diagram showing a magnetic disc driver including a sync controller according to the present invention. The magnetic disc driver of FIG. 4 differs from the magnetic disc apparatus disclosed in the above-mentioned U.S. Pat. No. 5,631.783 of Park, in that the present invention includes a sync controller 30. The magnetic disc driver of FIG. 4 performs read/write operations by the control of a disc data controller 28.

Disc data controller 28 uses a general disc data controller, such as a DP8466, and responds to a sector pulse STP output on signal 136 indicating the start of each data sector. In accordance with the response, disc data controller 28 generates a read gate signal RG for output on a signal line 128 during a read mode in the PID field and data field intervals, and simultaneously receives from a read/write channel 8 read data RDATA on a signal line 124, and a read clock signal RCLK on a signal line 120. During a write mode, disc data controller 28 generates read gate signal RG for output on signal line 128 and a write gate signal WG for output on a signal line 126 in the PID field and data field intervals, respectively, and transmits write data WDATA to read/write channel 8 on a signal line 118.

Read/write channel 8 comprises a preamplifier 12, a pulse detector 14, a data separator 16 and an encoder/decoder ENDEC 18 to read and write digital information from and to the magnetic disc surface via a read/write head 10. Preamplifier 12 operates in the write mode when a write gate control signal WGC is received in an active state on a signal line 142, and also operates in the read mode when a second read gate control signal RGC2 is output in the active state on a signal line 144. During the read mode, preamplifier 12 amplifies the signal read by head 10, and during the write mode, preamplifier 12 enables encoded write data EWD provided on a signal line 112 from ENDEC 18 to be written on the magnetic disc surface by driving head 10. Pulse detector 14 operates when second read gate control signal RGC2 is received in the active state on signal line 144, and detects data from the signal amplified by preamplifier 12. Data separator 16 separates detected data DETD into encoded read data ERD and a data clock signal DCLK, and then provides encoded read data ERD and data clock signal DCLK to ENDEC 18 on signal lines 116 and 114, respectively. ENDEC 18 operates in the read mode when second read gate control signal RGC2 is received in the active state, receives encoded read data ERD and data clock signal DCLK from data separator 16, decodes the encoded read data ERD and then outputs decoded ERD as read data RDATA on a signal line 122. On the other hand, ENDEC 18 operates in the write mode when write gate control signal WGC is received in the active state and encodes write data WDATA provided from disc data controller 28, thus applying encoded write data EWD to preamplifier 12 on signal line 112.

A WID reader 20 reads the WID from the magnetic disc surface through read/write channel 8 in response to a servo pulse SVO generated on a signal line 140 at the end of every servo information area during access of the magnetic disc. At this time, WID reader 20 outputs a first read gate control signal RGC1 on a signal line 130 during the WID field interval and reads the WID from the read data RDATA. Furthermore, in the read mode, WID reader 20 generates first read gate control signal RGC1 in response to read gate signal RG received on signal line 128 during the data field interval. Moreover, WID reader 20 outputs a PID selection signal PID-SEL on a signal line 132 in response to sector pulse STP and read gate signal RG.

A sector pulse generator 22 generates sector pulse STP from location information ST1 and ST2 (see FIGS. 6 and 7) included in the WID output by WID reader 20 on a signal line 134 to indicate the starting position of each data sector positioned in the corresponding data information area.

A PID generator 24 generates the PID of the corresponding data sector from the WID in response to sector pulse STP, and outputs the PID on a signal line 138.

A multiplexer 26 selectively provides read data RDATA output from ENDEC 18, or the PID output from PID generator 24, to disc data controller 28 on signal line 124 in response to PID selection signal PID-SEL. Multiplexer 26 provides the PID to disc data controller 28 during the PID field interval, and provides read data RDATA to disc data controller 28 during all of the other intervals. As indicated previously, the PID field represents a time interval required to generate the PID from the WID in PID generator 24, and transfer the PID from PID generator 24 to disc data controller 28.

Sync controller 30 controls read/write channel 8 to operate in accordance with a presently selected mode during the PID field interval. In the read mode, sync controller 30 provides data synchronization while the PID is being transferred to disc data controller 28. In the write mode, sync controller 30 enables the data preamble necessary for data synchronization to be written on the magnetic disc while the PID is being transferred to disc data controller 28.

Figure 5:
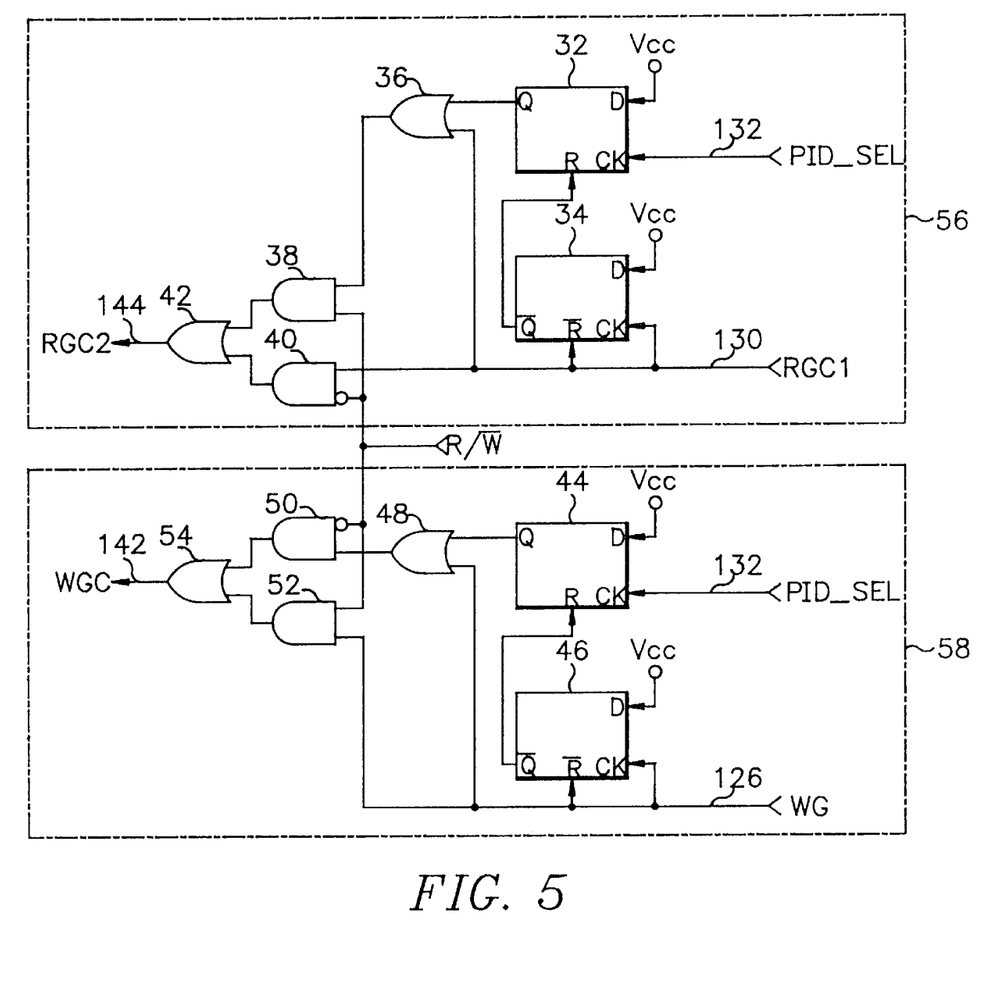
FIG. 5 is a detailed circuit diagram showing the sync controller according to the present invention.

FIG. 5 shows a detailed circuit construction of sync controller 30 in FIG. 4. Signal lines 126, 130, 132, 142 and 144 refer to the same reference numerals as shown in FIG. 4.

A read gate controller 56 comprises flip-flops 32 and 34, OR gates 36 and 42 and AND gates 38 and 40. In the read mode, read gate controller 56 controls read/write channel 8 to operate in the read mode in response to second read gate control signal RGC2 during the PID field interval, thereby enabling data synchronization while the PID is being transferred.

A write gate controller 58 comprises flip-flops 44 and 46, OR gates 48 and 54 and AND gates 50 and 52. In the write mode, write gate controller 58 controls read/write channel 8 to operate in the write mode in response to write control signal WGC during the PID field interval, thereby enabling the data preamble necessary for data synchronization to be written in the PID field of the magnetic disc while the PID is being transferred. In FIG. 5, AND gates 38, 40, 50 and 52 receive a R/W signal corresponding to the read and write modes.

Figure 6:
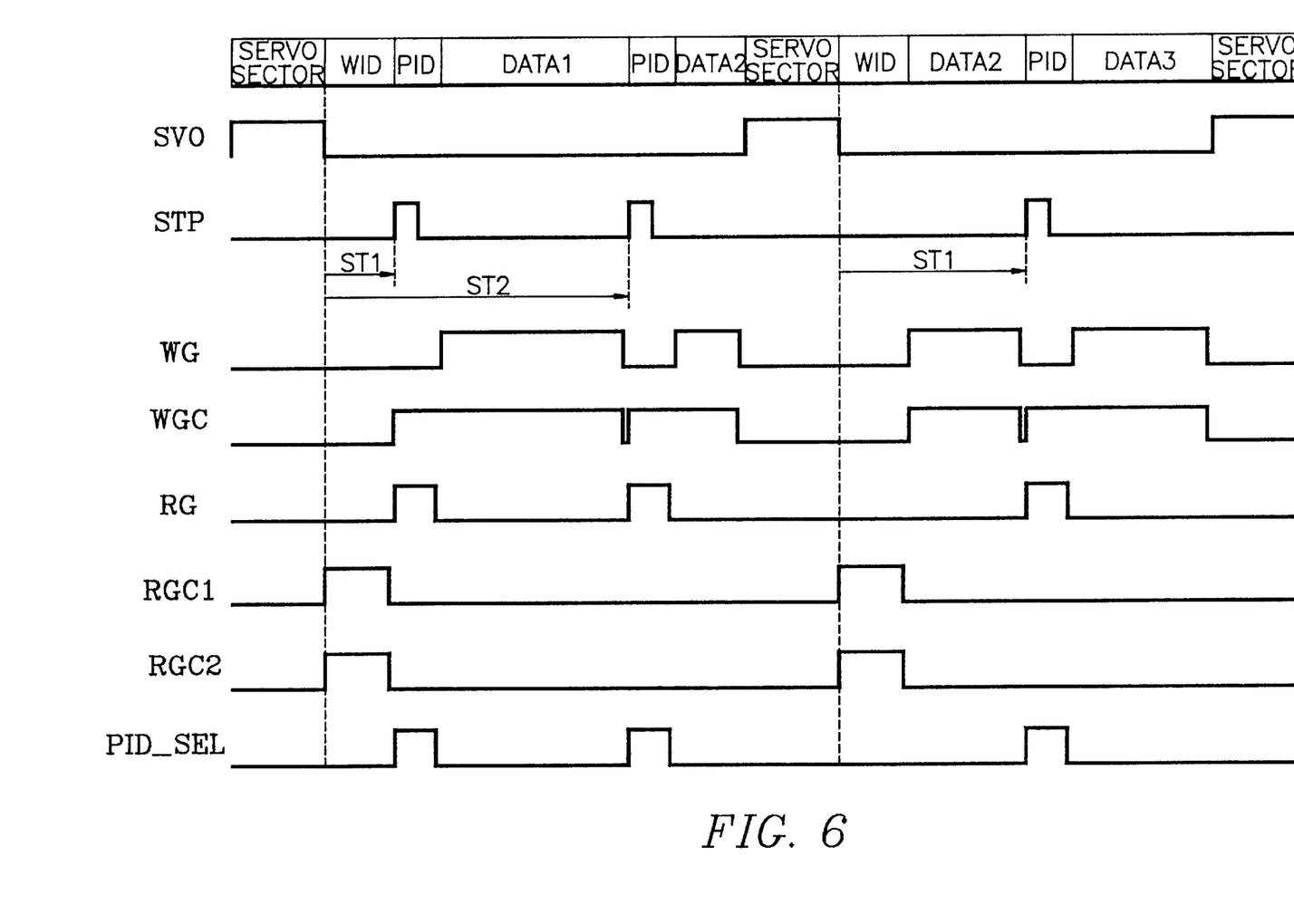
FIG. 6 is an operational timing diagram when data is recorded on the magnetic disc according to the present invention.

FIG. 6 is an operational timing diagram when data is written on the magnetic disc having a data format according to the present invention, and illustrates an embodiment in which a second data sector is divided such that a part thereof is located in a following data information area.

The operation when data is written on the magnetic disc having the data format of FIG. 3 according to the present invention will now be described in detail with reference to the operational timing diagram of FIG. 6.

After every servo sector, WID reader 20 activates first read gate control signal RGC1 at the falling edge of servo pulse SVO, as shown in FIG. 6. At this time, read gate controller 56 applies first read gate control signal RGC1 to read/write channel 8 as second read gate control signal RGC2, as shown in FIG. 6. In response, read/write channel 8 operates in the read mode during the WID interval and WID reader 20 reads the WID. After reading the WID, WID reader 20 deactivates first read gate control signal RGC1, thereby deactivating the second read gate control signal RGC2, as shown in FIG. 6.

Sector pulse generator 22 generates sector pulse STP at the start of every PID interval. PID generator 24 generates the corresponding PID by classifying the first and second data sectors in response to sector pulse STP. At this time, multiplexer 26 applies the PID to disc data controller 28 during the PID interval in response to PID selection signal PID-SEL.

After receiving the PID from multiplexer 26, disc data controller 28 activates write gate signal WG to the logic "high" state for the data field, and then outputs write data WDATA to ENDEC 18. At this time, write gate signal WG is applied to write gate controller 58, and then is generated as write gate control signal WGC during the PID interval and data interval, as shown in FIG. 6. Accordingly, write gate control signal WGC is applied to read/write channel 8. After the write data WDATA is encoded by ENDEC 18, it is transmitted to preamplifier 12 and written in the corresponding PID interval and data area of the magnetic disc by head 10.

At this time, as the write gate control signal WGC is activated during the PID interval, the data preamble is recorded in the PID interval. Accordingly, by using the PID interval as a data area, the data storage capacity of the magnetic disc can be increased.

Figure 7:
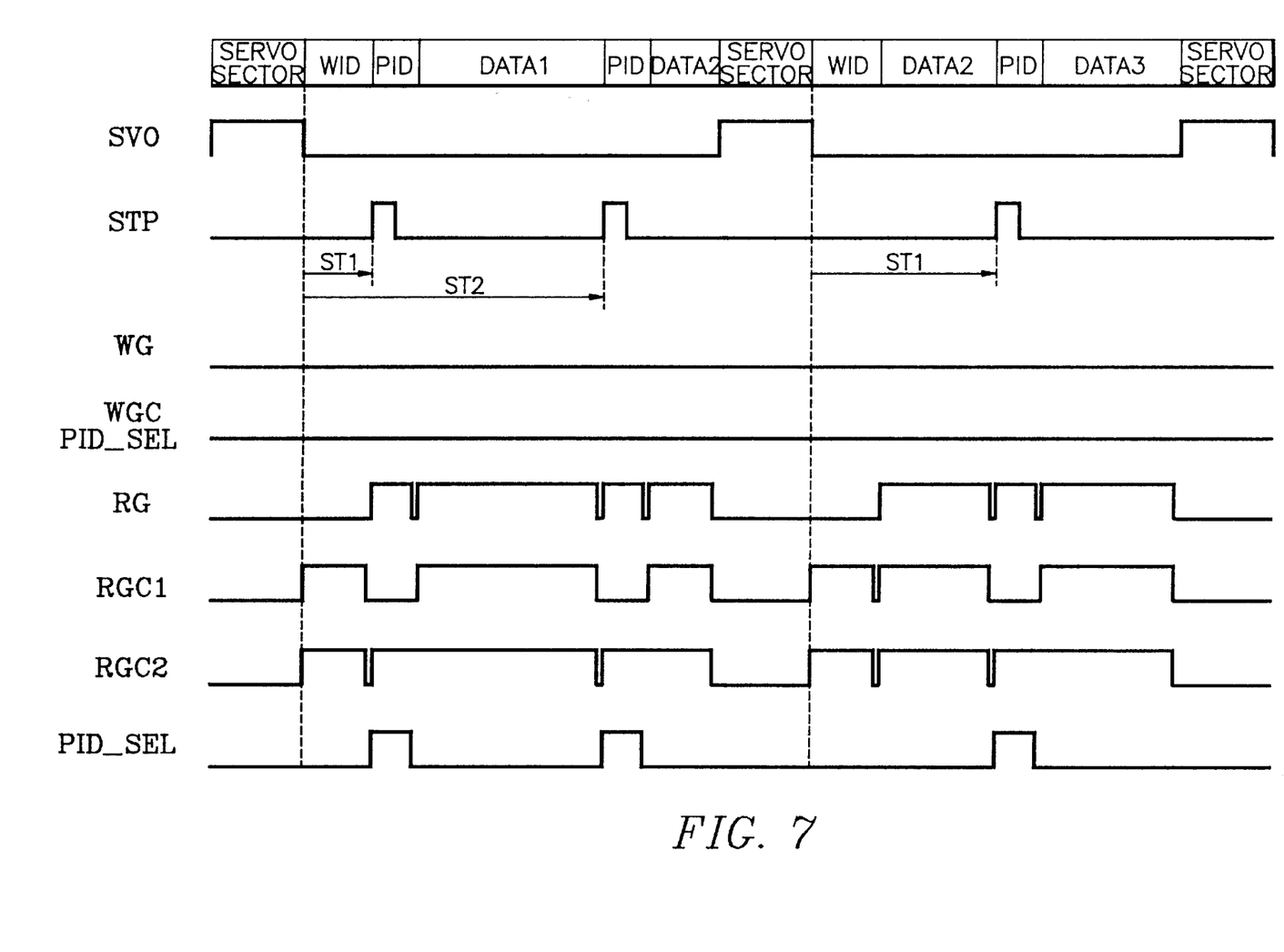
FIG. 7 is an operational timing diagram when data recorded on the magnetic disc is read out according to the present invention.

FIG. 7 is an operational timing diagram when data recorded on the magnetic disc having a data format according to the present invention is read, and illustrates an embodiment in which a second data sector is divided such that a part thereof is located in a following data information area.

The operation when the data recorded on the magnetic disc having the data format of FIG. 3 is read out will now be described in detail with reference to the operational timing diagram of FIG. 7.

After every servo sector, WID reader 20 activates first read gate control signal RGC1 at the falling edge of servo pulse SVO, as shown in FIG. 7. At this time, read gate controller 56 applies first read gate control signal RGC1 to read/write channel 8 as second read gate signal RGC2, as shown in FIG. 7. In response, read/write channel 8 operates in the read mode during the WID interval and WID reader 20 reads the WID. After reading the WID, WID reader 20 deactivates first read gate control signal RGC1 during the PID interval, and activates first read gate control signal RGC1 during the data interval. In response to first read gate control signal RGC1, sync controller 30 generates second read gate control signal RGC2 during the PID interval and data interval, as shown in FIG. 7, and applies second read gate control signal RGC2 to read/write channel 8.

Sector pulse generator 22 generates sector pulse STP at the start of every PID interval. PID generator 24 generates the corresponding PID by classifying the first and second data sectors in response to sector pulse STP. At this time, multiplexer 26 transmits the PID to disc data controller 28 during the PID interval in response to PID selection signal PID-SEL. In response to the PID, disc data controller 28 activates read gate signal RG to the logic "high" state for the data field. Accordingly, first read gate control signal RGC1 is activated, and thereby second read gate control signal RGC2 is activated during the data interval. In response to second read gate control signal RGC2, read/write channel 8 operates in the read mode. During the read mode, read data RDATA is applied to disc data controller 28 through multiplexer 26.

During this time, since second read gate control signal RGC2 is activated in the PID interval, the data preamble recorded in the PID interval is read out while the PID is being transferred to disc data controller 28 during the PID interval and data synchronization is achieved.

As described above, the present invention is capable of increasing the storage capacity of a magnetic disc by using the PID interval on the magnetic disc as a data preamble interval for providing data synchronization.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A magnetic disc used in a constant-density magnetic disc driving apparatus, said magnetic disc comprising:
    a servo information area;
    a wedge identification field positioned behind said servo information area and storing a wedge identification for identifying a plurality of data sectors located within a corresponding data information area;
    a pseudo identification field positioned at a first portion of each one of said plurality of data sectors and representing a time interval required to generate from said wedge identification a pseudo identification that identifies a corresponding one of said plurality of data sectors and transfer said pseudo identification to a controller of said magnetic disc driving apparatus, said pseudo identification field storing a data preamble that provides data synchronization for said corresponding one of said plurality of data sectors; and
    a data field positioned behind said pseudo identification field for storing data, said data field and said pseudo identification field comprising a single one of said plurality of data sectors.

2. The magnetic disc as claimed in claim 1, wherein said data field further comprises a data address mark indicating a starting point of said data, an error correction code positioned behind said data, and a data postamble positioned behind said error correction code.

3. A constant-density magnetic disc apparatus, comprising:
    a magnetic disc comprising a plurality of servo information areas, a wedge identification field positioned behind each one of said plurality of servo information areas and storing a wedge identification for identifying a plurality of data sectors located within a corresponding data information area, and a pseudo identification field positioned at a first portion of each one of said plurality of data sectors and representing a first time interval required to generate from said wedge identification a pseudo identification that identifies a corresponding one of said plurality of data sectors and transfer said pseudo identification to a controller of said magnetic disc apparatus, said pseudo identification field storing a data preamble that provides data synchronization for said corresponding one of said plurality of data sectors;
    a read/write channel for generating encoded data and then writing said encoded data on said magnetic disc during a write mode, and for generating detected data from a signal read from said magnetic disc and then decoding said detected data during a read mode;
    wedge identification reading means for reading said wedge identification from said magnetic disc through said read/write channel during a second time interval represented by said wedge identification field;
    sector pulse generating means for generating a sector pulse indicating a start position of each one of said plurality of data sectors located within said corresponding data information area in response to said wedge identification;
    pseudo identification generating means for generating said pseudo identification from said wedge identification in response to said sector pulse; and
    sync control means for controlling said read/write channel to operate in a respective operating mode during said first time interval represented by said pseudo identification field.

4. The constant-density magnetic disc apparatus as claimed in claim 3, wherein said sync control means comprises:
    read gate control means for controlling said read/write channel to operate in a read mode during said first time interval represented by said pseudo identification field to provide data synchronization while said pseudo identification is transferred from said pseudo identification generating means to said controller of said magnetic disc apparatus; and
    write gate control means for controlling said read/write channel to operate in a write mode during said first time interval represented by said pseudo identification field to enable said data preamble to be written in said pseudo identification field while said pseudo identification is transferred from said pseudo identification generating means to said controller of said magnetic disc apparatus.

5. A method for reading data from a magnetic disc, comprising the steps of:
    reading a wedge identification from a wedge identification field positioned behind a servo sector on said magnetic disc, said wedge identification identifying a plurality of data sectors located within a corresponding data information area;
    generating from said wedge identification a pseudo identification during an interval corresponding to a pseudo identification field positioned behind said wedge identification field on said magnetic disc, said pseudo identification identifying a corresponding one of said plurality of data sectors that is positioned behind said pseudo identification field on said magnetic disc;

reading a data preamble written within said pseudo identification field; and reading said data from said corresponding one of said plurality of data sectors in accordance with a synchronization provided from said reading of said data preamble.

6. The method for reading data from a magnetic disk as claimed in claim 5, wherein said pseudo identification includes a data preamble that provides data synchronization for said corresponding one of said plurality of data sectors.

7. A method for writing data on a magnetic disc, comprising the steps of:

reading a wedge identification from a wedge identification field positioned behind a servo sector on said magnetic disc, said wedge identification for identifying a plurality of data sectors located within a corresponding data information area;

generating from said wedge identification a pseudo identification during an interval corresponding to a pseudo identification field positioned behind said wedge identification field on said magnetic disc, said pseudo identification for identifying a corresponding one of said plurality of data sectors that is positioned behind said pseudo identification field on said magnetic disc;

writing a data preamble within said pseudo identification field; and writing said data within said corresponding one of said plurality of data sectors.

8. A magnetic disc used in a magnetic disc driving apparatus, said magnetic disc comprising:

a servo information area;

a wedge identification field positioned behind said servo information area and storing a wedge identification for identifying a plurality of data sectors located within a corresponding data information area;

a pseudo identification field positioned at a first portion of each one of said plurality of data sectors and representing a time interval required to generate from said wedge identifications pseudo identification that identifies a corresponding one of said plurality of data sectors and transfer said pseudo identification to a controller of said magnetic disc driving apparatus, said pseudo identification field storing a data preamble that provides data synchronization for said corresponding one of said plurality of data sectors; and a data field positioned behind said pseudo identification field for storing data, said data field and said pseudo identification field comprising a single one of said plurality of data sectors.

9. The magnetic disc as claimed in claim 8, wherein said data field further comprises a data address mark indicating a starting point of said data, an error correction code positioned behind said data, and a data postamble positioned behind said error correction code.

10. The magnetic disc of claim 8, wherein said wedge identification includes information indicating a starting position for each one of said plurality of data sectors.

11. A magnetic disc apparatus, comprising:

a magnetic disc comprising a plurality of servo information areas, a wedge identification field positioned behind each one of said plurality of servo information areas and storing a wedge identification for identifying a plurality of data sectors located within a corresponding data information area, and a pseudo identification field positioned at a first portion of each one of said plurality of data sectors and representing a first time interval required to generate from said wedge identification a pseudo identification that identifies a corresponding one of said plurality of data sectors and transfer said pseudo identification to a controller of said magnetic disc apparatus, said pseudo identification field storing a data preamble that provides data synchronization for said corresponding one of said plurality of data sectors;

a read/write channel for generating encoded data and then writing said encoded data on said magnetic disc during a write mode, and for generating detected data from a signal read from said magnetic disc and then decoding said detected data during a read mode;

wedge identification reading means for reading said wedge identification from said magnetic disc through said read/write channel during a second time interval represented by said wedge identification field;

sector pulse generating means for generating a sector pulse indicating a start position of each one of said plurality of data sectors located within said corresponding data information area in response to said wedge identification;

pseudo identification generating means for generating said pseudo identification from said wedge identification in response to said sector pulse; and sync control means for controlling said read/write channel to operate in a respective operating mode during said first time interval represented by said pseudo identification field.

12. The magnetic disc apparatus as claimed in claim 11, wherein said sync control means comprises:

read gate control means for controlling said read/write channel to operate in a read mode during said first time interval represented by said pseudo identification field to provide data synchronization while said pseudo identification is transferred from said pseudo identification generating means to said controller of said magnetic disc apparatus; and write gate control means for controlling said read/write channel to operate in a write mode during said first time interval represented by said pseudo identification field to enable said data preamble to be written in said pseudo identification field while said pseudo identification is transferred from said pseudo identification generating means to said controller of said magnetic disc apparatus.

13. The magnetic disc apparatus of claim 11, wherein said wedge identification includes information indicating a starting position for each one of said plurality of data sectors.

* * * * *